United States Patent
Lu et al.

(10) Patent No.: US 10,133,348 B2
(45) Date of Patent: Nov. 20, 2018

(54) GAZE-TRACKING DRIVEN REGION OF INTEREST SEGMENTATION

(71) Applicant: KONINKLIJKE PHILIPS N.V., Eindhoven (NL)

(72) Inventors: Kongkuo Lu, Briarcliff Manor, NY (US); Eric Cohen-Solal, Ossining, NY (US); Yuechen Qian, Lexington, MA (US); Gabriel Ryan Mankovich, Boston, MA (US); Axel Saalbach, Hamburg (DE); Daniel Bystrov, Hamburg (DE)

(73) Assignee: Koninklijke Philips N.V., Eindhoven (NL)

( * ) Notice: Subject to any disclaimer, the term of this patent is extended or adjusted under 35 U.S.C. 154(b) by 25 days.

(21) Appl. No.: 15/518,820

(22) PCT Filed: Oct. 10, 2015

(86) PCT No.: PCT/IB2015/057760
§ 371 (c)(1),
(2) Date: Apr. 13, 2017

(87) PCT Pub. No.: WO2016/063167
PCT Pub. Date: Apr. 28, 2016

(65) Prior Publication Data
US 2017/0242481 A1 Aug. 24, 2017

Related U.S. Application Data

(60) Provisional application No. 62/067,464, filed on Oct. 23, 2014.

(51) Int. Cl.
*G06K 9/00* (2006.01)
*G06F 3/01* (2006.01)
(Continued)

(52) U.S. Cl.
CPC .......... *G06F 3/013* (2013.01); *G06F 3/04842* (2013.01); *G06K 9/00604* (2013.01);
(Continued)

(58) Field of Classification Search
USPC ....................................................... 382/128
See application file for complete search history.

(56) References Cited

U.S. PATENT DOCUMENTS 5,862,245 A * 1/1999 Renouard ............ G06K 9/0063
382/113
2003/0210229 A1* 11/2003 Nishimura ............ G06F 3/0386
345/157

(Continued)

OTHER PUBLICATIONS

Chan, T.F. et al., "Active Contours Without Edges", IEEE Transactions on Image Processing, vol. 10, No. 2, Feb. 2001, p. 266-277.
(Continued)

*Primary Examiner* — Jerome Grant, II

(57) ABSTRACT

A region of interest segmentation system includes a display device, a gaze-tracking device, a gaze point collector, a boundary identifier, and a region identifier. The display device displays an image. The gaze-tracking device, generates gaze points relative to the displayed image. The gaze point collector selects gaze points from the generated gaze points corresponding to a region of interest of the displayed image. the boundary identifier estimates a boundary based on the selected gaze points. The region identifier segments the region of interest based on the estimated boundary.

15 Claims, 5 Drawing Sheets

(51) Int. Cl.
*G06K 9/32* (2006.01)
*G06F 3/0484* (2013.01)
*G06T 7/11* (2017.01)

(52) U.S. Cl.
CPC .............. *G06K 9/3233* (2013.01); *G06T 7/11* (2017.01); *G06T 2207/20104* (2013.01)

(56) References Cited

U.S. PATENT DOCUMENTS

| | | | |
|---|---|---|---|
| 2005/0069206 A1 | 3/2005 | Ma et al. | |
| 2006/0112334 A1 | 5/2006 | Endrikhovski et al. | |
| 2009/0086165 A1 | 4/2009 | Beymer | |
| 2009/0275834 A1* | 11/2009 | Watanabe | A61B 5/02007 600/443 |
| 2012/0326969 A1 | 12/2012 | Ramanathan et al. | |
| 2013/0107207 A1* | 5/2013 | Zhao | A61B 3/0058 351/206 |
| 2013/0156267 A1* | 6/2013 | Muraoka | A61B 6/5217 382/103 |
| 2014/0003658 A1 | 1/2014 | Hein | |
| 2017/0212583 A1* | 7/2017 | Krasadakis | G06F 3/013 |
| 2017/0329501 A1* | 11/2017 | Tsunomori | G06F 3/04845 |
| 2017/0333140 A1* | 11/2017 | Unsworth | A61B 34/30 |
| 2018/0018772 A1* | 1/2018 | Fujiwara | G06T 7/0016 |
| 2018/0061054 A1* | 3/2018 | Abraham | G06T 7/0044 |
| 2018/0130206 A1* | 5/2018 | Hakoshima | H04N 7/18 |

OTHER PUBLICATIONS

Lu, K. et al., "Interactive segmentation based on the live wire for 3D CT chest image analysis", Int J Computer Assisted Radiology and Surgery, (2007) 2:151-167.

Lankton, S. et al., "Localizing Region-Based Active Contours", IEEE Transactions on Image Processing, vol. 17, No. 11, Nov. 2008, p. 2029-2039.

Kass, M., et al., "Snakes: Active contour models", Int'l J. Computer Vision, vol. 1, pp. 321-331, 1988.

\* cited by examiner

GAZE-TRACKING DRIVEN REGION OF INTEREST SEGMENTATION

CROSS-REFERENCE TO PRIOR APPLICATIONS

This application is the U.S. National Phase application under 35 U.S.C. § 371 of International Application No. PCT/IB2015/057760, filed on Oct. 10, 2015, which claims the benefit of U.S. Provisional Application No. 62/067,464, filed on Oct. 23, 2014. This application is hereby incorporated by reference herein.

The following relates generally to medical imaging. It finds particular application in conjunction with segmentation of regions of interest in medical images, and will be described with particular reference thereto. However, it will be understood that it also finds application in other usage scenarios and is not necessarily limited to the aforementioned application.

Segmentation of regions of interest (ROIs) is used in analysis of tissues and structures in medical images, such as disease detection and/or disease progression. Segmentation involves identifying boundaries of a structure and/or tissues and can include measurements based on the identified boundaries and other characteristics, such as intensity, size, shape and/or change in measurements from one image to another. Segmentation is employed in many imaging modalities, such as Magnetic Resonance Imaging (MRI), Ultrasound (US), X-ray Computed Tomography (CT), Positron Emission Tomography (PET), Single Proton Emission Computed Tomography (SPECT), combinations, and the like.

Segmenting target ROIs can be difficult, due to the varying intensity, size, and shapes because of the underlying nature of the ROIs, the different modalities and the different imaging parameters available with each modality. Target ROIs to be analyzed can include tumors, nodules, lymph nodes, tissues with ground glass opacity which a trained healthcare practitioner may recognize, but may not be sourced from a medical atlas. Modalities present different image representations of structures and/or metabolic activities. The target ROIs may share detectable features with surrounding structures/organs/tissues. Each modality can use different imaging parameters, which for the same subject and same time present different image representations.

One approach is manual identification of a target ROI by a healthcare practitioner using a set of tools to indicate the target ROI. For example, using a line drawing tool and/or a polygonal shape tool, the healthcare practitioner outlines an approximation of the target ROI. The tools are typically based on a computer mouse and/or a light pen used to draw shapes along the boundary. A segmentation algorithm further refines the roughly drawn shape to segment the tissues and/or structure. This approach focuses computer processing resources toward the manually identified target ROI and calls for significant healthcare practitioner time, which reduces throughput in analyzing the quantity of images by the practitioner. The process is tedious and time-consuming and generally considered not cost effective, even for the images of an individual subject, much less for a quantity of subjects imaged by an imaging facility.

Another approach is full automation, which segments all tissues and/or structures in an image without healthcare practitioner input. Although this approach conserves scarce healthcare practitioner resources, segmentation algorithms sometimes fail, due to the variability of structures. Significant quantities of computing resources and time are wasted on segmenting structures not used in analysis.

Hybrid approaches include different aspects of each, with healthcare practitioner input typically indicating a point and/or a polygonal shape through the use of an input device manipulated by the hand. Input devices call for manual dexterity and time to coordinate movements of the device with representations of the placement of the input relative to the image. Basic operating systems include parameters for cursor manipulation by a mouse, such as click speed, pointer speed, pointer trails, pointer representation and the like, indicative of the impact by an input device on individual computer user productivity and throughput.

The following discloses a new and improved gaze-tracking driven region of interest segmentation, which addresses the above referenced issues, and others.

In accordance with one aspect, a region of interest (ROI) segmentation system includes a display device, a gaze-tracking device, a gaze point collector, a boundary identifier, and a region identifier. The display device displays an image. The gaze-tracking device provides tracked gaze points relative to the displayed image. The gaze point collector selects gaze points from the provided gaze points corresponding to a region of interest (ROI) of the displayed image. The boundary identifier estimates a boundary based on the selected gaze points. The region identifier segments the ROI based on the estimated boundary.

In accordance with another aspect, a method of region of interest (ROI) segmentation includes displaying an image. Gaze points are generated relative to the displayed image. Gaze points are selected from the generated gaze points corresponding to a region of interest (ROI) of the displayed image. A boundary is estimated based on the selected gaze points. The ROI is segmented based on the estimated boundary.

In accordance with another aspect, a region of interest (ROI) segmentation system includes one or more processors configured to display a medical image on a display device. Gaze points are selected according to the predetermined dwelling period generated by a gaze-tracking device based on an input of a dwelling point on the displayed medical image. The dwelling point spatially selects a point within a region of interest (ROI) of the displayed medical image and temporally selects a point relative to the predetermined dwelling period. The selected gaze points are filtered spatially based on image characteristics at locations corresponding to the gaze points. The ROI is segmented based on spatial locations of filtered gaze points and pixel values corresponding to the displayed image.

One advantage is the identification of a target region of interest with a cluster of gaze points.

Another advantage resides in the speed of healthcare practitioner input in identifying the target ROI.

Another advantage resides in the specificity of the input in identifying the target ROI.

Another advantage resides in minimizing user interaction.

Another advantage resides in a distribution of spatial locations and/or image values initially obtained indicating the target ROI.

Another advantage resides in the speed of segmentation from initial input to segmented target ROI.

Still further advantages will be appreciated to those of ordinary skill in the art upon reading and understanding the following detailed description.

The invention may take form in various components and arrangements of components, and in various steps and arrangement of steps. The drawings are only for purposes of illustrating the preferred embodiments and are not to be construed as limiting the invention.

FIG. 1 diagrammatically illustrates an embodiment of a gaze-tracking driven region of interest segmentation system.

Figure 7:
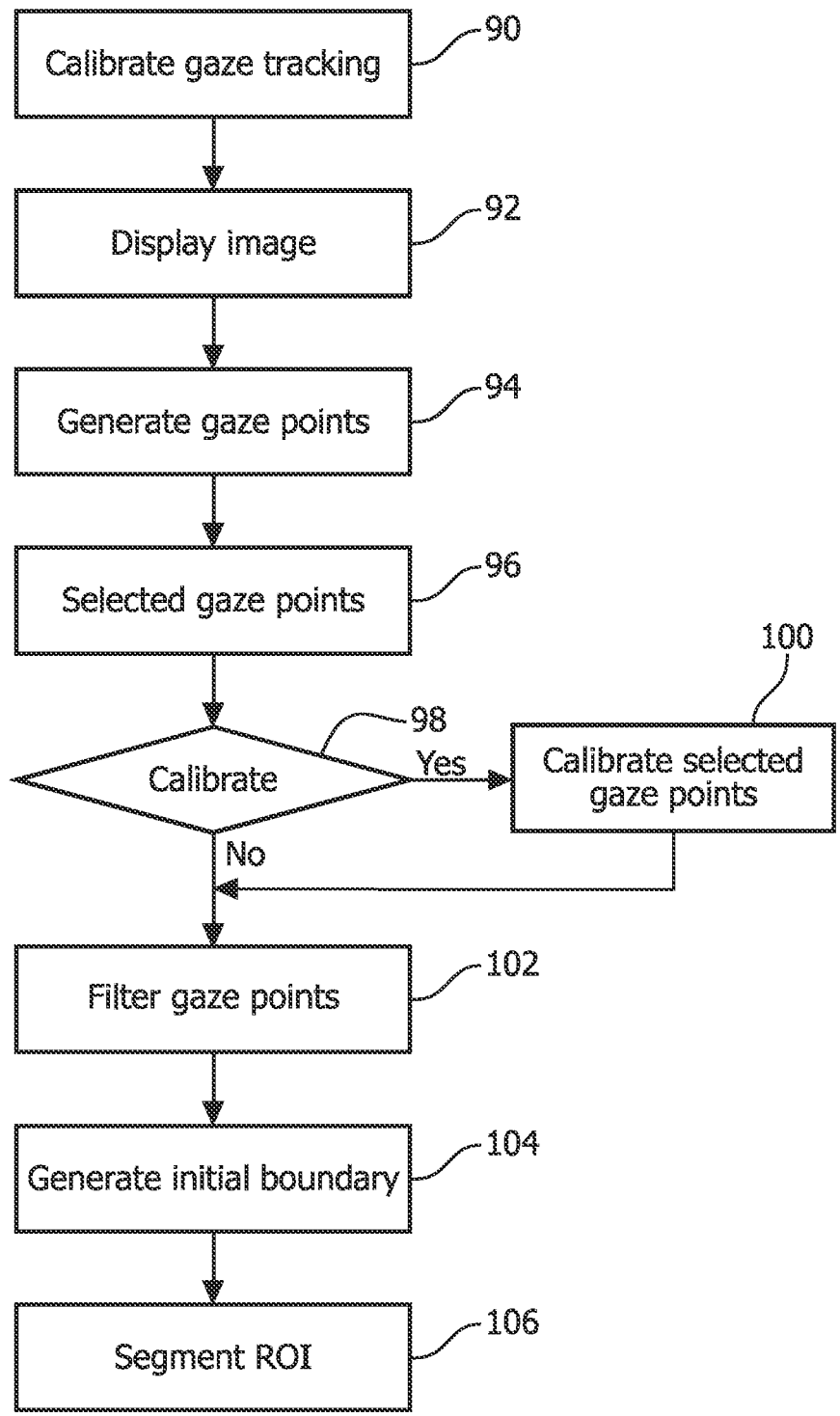

FIG. 7 flowcharts one method of using an embodiment of gaze point driven ROI segmentation.

Figure 1:
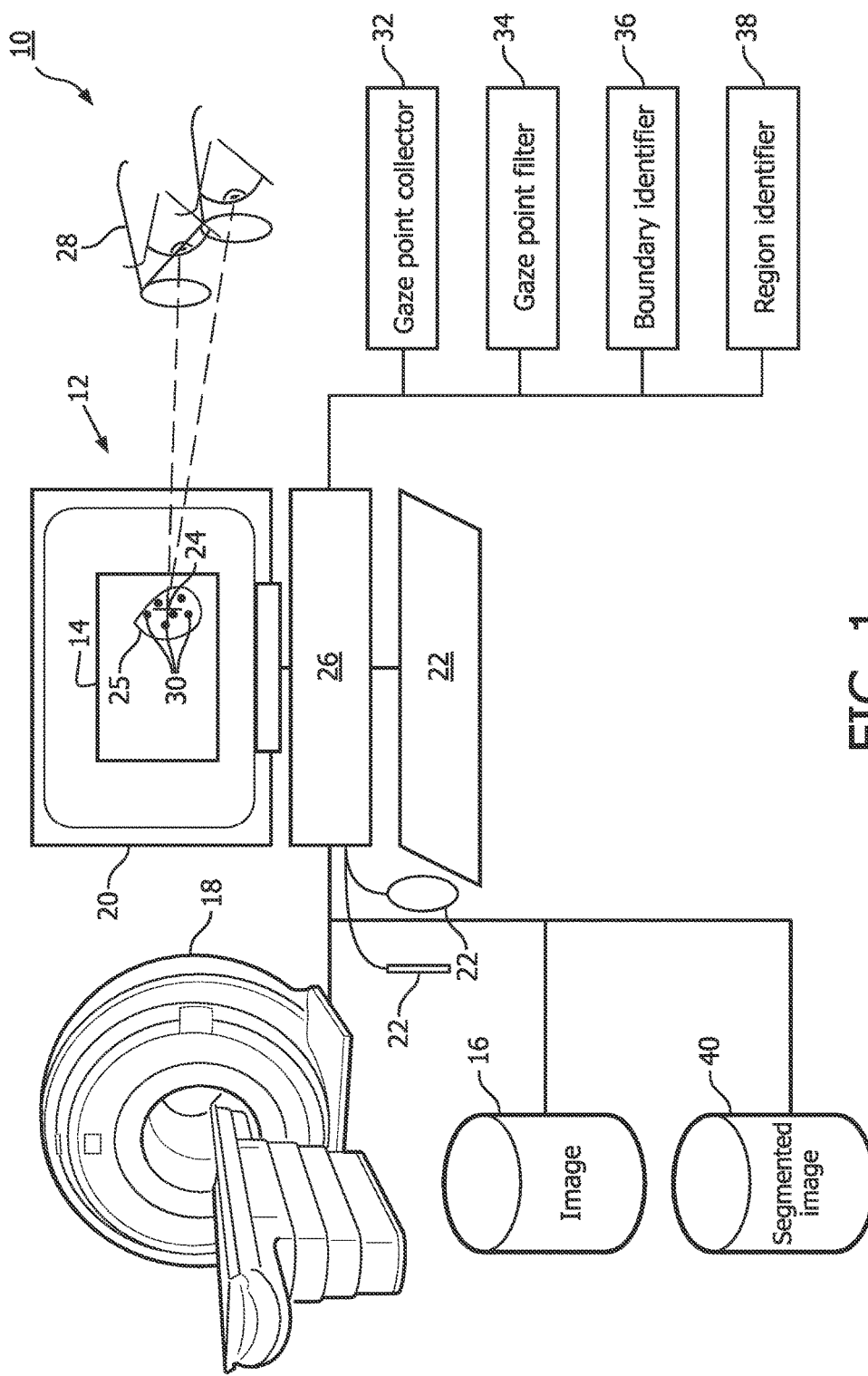

With reference to FIG. 1, an embodiment of gaze-tracking driven region of interest segmentation system 10 is diagrammatically illustrated. A computer or computing device 12 receives an image 14 from storage 16 or from a medical imaging device 18 which generates a medical image of a subject. The computer 12 is suitably embodied by a workstation, laptop, smartphone, tablet, and the like. The displayed image can be 2-dimensional, 2-dimensional slices of a 3-dimensional volume representation, a 2-dimensional representation of a 3-dimensional volume, and the like. The displayed image 14 can include motion. The storage 16 includes system accessible storage, such as a picture archiving and communication system (PACS), departmental radiology system, patient medical record system, and/or directly accessible storage, such as cloud storage, local storage, and the like. The medical imaging device 18 is a device which generates medical images of a subject, such as a magnetic resonance imaging (MRI) scanner, a computed tomography (CT) scanner, a Positron Emission Tomographic (PET) scanner, a Single Proton Emission Computed Tomographic (SPECT) scanner, an Ultrasound (US) scanner, combinations thereof, and the like. The computer 12 includes a display device 20 which displays the received image. The computer 12 includes one or more data processors 26.

The computer 12 includes one or more input devices 22, such as a mouse, light pen, keyboard, microphone, touch screen, and the like, which input a reference point or dwelling point 24 relative to the displayed image 14. For example, with a pointer of a mouse positioned within a region of interest (ROI) 25, a click of a mouse button identifies spatially and temporally the dwelling point 24. The dwelling point 24 can be represented in the displayed image, such as with a colored dot or geometric shape, contrasted cross hairs, and the like.

A gaze-tracking device or means 28 generates gaze points 30 relative to the displayed image 14. The gaze-tracking device 28 can be mounted relative to the computer 12 and/or display device 20, and/or include a body worn device, such as eyeglasses, and the like. For example, Tobii™ portable eye tracking systems attached and calibrated with laptops and workstations use micro-projectors to create corneal reflection patterns to estimate gaze direction. Imaging sensors record the corneal reflection patterns with sufficient resolution to determine the gaze points. The gaze-tracking device 28 can include calibration activities to calibrate the gaze points 30 relative to the display device 20 and/or the displayed image 14. The gaze-tracking device 28 can include profiles calibrated to the gaze of individual users. The gaze-tracking device 28 generates the gaze-points 30 in real-time, such as 30 gaze points per second.

In one embodiment, the gaze-tracking device 28 tracks and presents input indicative of the dwelling point 24. For example, with a gaze directed to a localized area for a predetermined period of time and/or accompanied by another input such as a voice command, the dwelling point is fixed spatially and temporally.

A gaze point collector, processor, computer routine, or means 32 selects gaze points from the generated gaze points 30 corresponding to the ROI 25 of the displayed image 14. Each gaze point is related in the coordinate system of the displayed image 14. The dwelling point 24 identifies a spatial and temporal proximity of the gaze points 30. For example, the dwelling point within the ROI defines a distance to each gaze point relative to the ROI, a temporal relationship with the ROI in the instance of motion based images, and a temporal relationship to the dwelling point, such as ±1 second of the time of the dwelling point.

The temporal proximity can include gaze points 30 in a predetermined time window or interval $[T_0, T_1]$ relative to the dwelling point 24. For example, selected gaze points include the gaze points tracked in the time interval one second before the dwelling point. In another example, the selected gaze points include gaze points tracked in the time interval between one second before the dwelling point and a half second after the dwelling point. The gaze points are sampled frequently, e.g. 30 times per second. The predetermined interval, $[T_0, T_1]$ is selected large enough to generate a suitable sampling or selection of the tracked gaze points 30. The predetermined time interval, $[T_0, T_1]$ is determined in temporal proximity to the dwelling point 24, e.g. time before and/or after dwelling point fixation to locate the gaze points in spatial proximity to the ROI. The distribution of selected gaze points provides more information, e.g. variance, than an input of a single location indicating the ROI.

A gaze point filter, processor, computer routine, or means 34 filters the selected gaze points according to image characteristics of the related ROI 25. For example, the gaze points 30, corresponding to pixel intensities similar to the pixel intensity of the dwelling point 24, are included in filtered gaze points. The image characteristics can include a spatial measurement and/or image pixel values. The gaze point filter 34 uses a maximum likelihood analysis of the image characteristics between the spatial locations of the gaze points 30 and the dwelling point 24.

A boundary identifier, processor, computer routine, or means 36 estimates a boundary based on the selected gaze points. In one embodiment, the selected gaze points are the filtered gaze points by the gaze point filter 34. The boundary changes from discrete points of the gaze points 30 to a continuous bounding area or volume, which approximates an area or volume of the displayed image 14 within the ROI 25.

A region identifier, segmenting processor, computer routine, or means 38 segments the ROI 25 based on the generated boundary. The region identifier uses an algorithm to expand and/or contract the boundary to the ROI 25 based on image characteristics, and uses the generated boundary as an initial estimation for input to the automatic segmentation algorithm. The segmented ROI 25 is displayed on the displayed image 14, separately, and/or stored in an image data store 40, such as system accessible storage, and/or directly accessible storage. Area and/or volumetric measurements can be performed using the segmented ROI 25. For example, the segmented ROI can be used to determine growth of a tumor from segmenting the ROI in one image of a subject and in a later image of the same subject.

The gaze point collector 32, the gaze point filter 34, the boundary identifier 36, and the region identifier 38 are suitably embodied by the data processing device 26, such as the electronic processor or electronic processing device of the computer 12, or by a network-based server computer operatively connected with the computer 12 by a network, or the like. Moreover, the disclosed collection, filtering, boundary identification, and segmentation techniques are suitably implemented, using a non-transitory storage medium storing instructions (e.g., software) readable by a data processing device and executable by the data processing device to perform the disclosed techniques.

Figure 2:
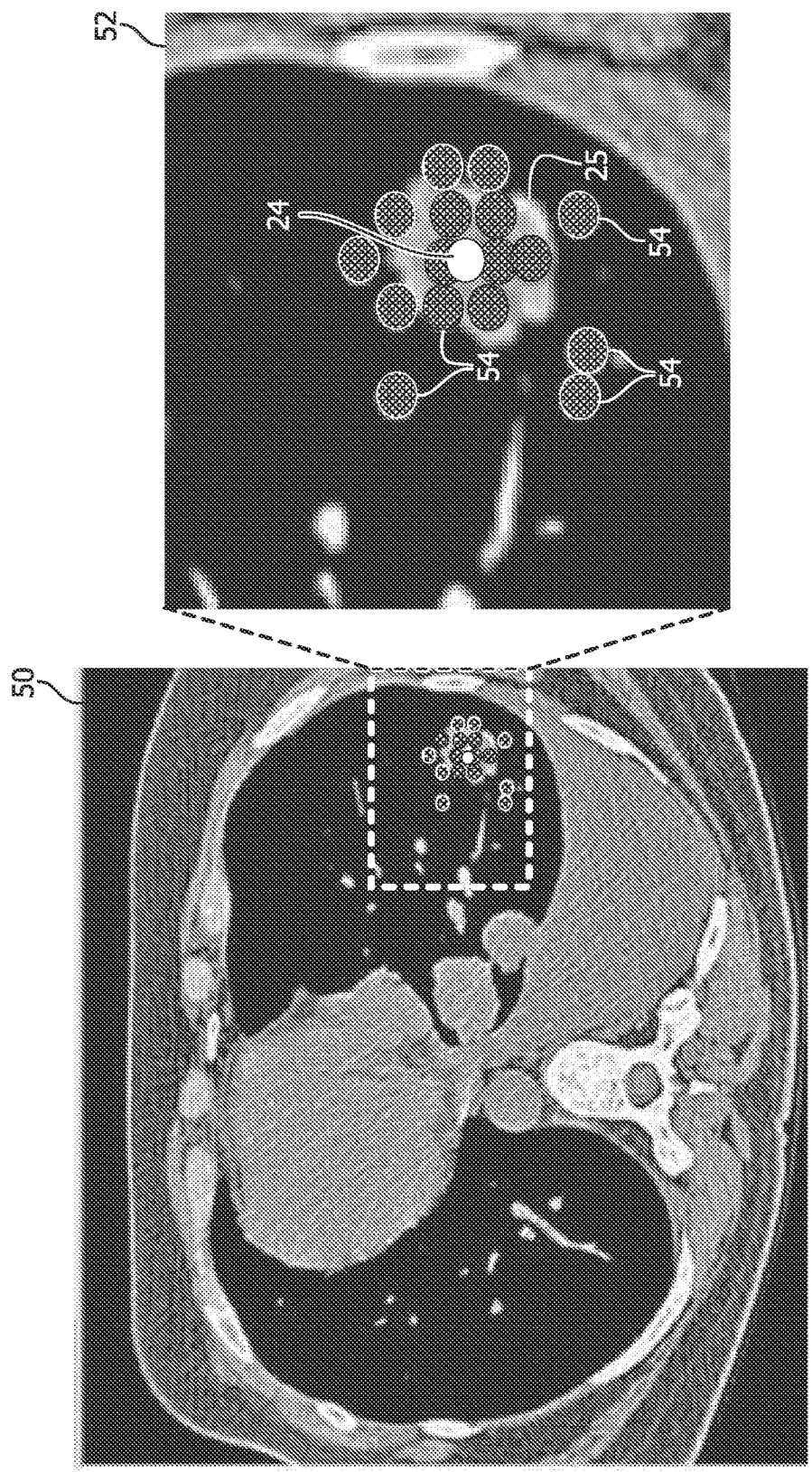
FIG. 2 illustrates an exemplary medical image with an exploded view of the displayed image and the gaze points.

With reference to FIG. 2, an exemplary medical image 50 and an exploded view 52 of a portion of the displayed image 14 in which selected gaze points 54 are illustrated. The ROI 25 is a whitish area generally covered by the selected gaze points 54. The selected gaze points 54 are illustrated in a checkerboard pattern. The selected gaze points 54 can be illustrated with different colors, shapes, and/or intensities that contrast with the displayed image 14. The dwelling point 24 is indicated with a white circle. The dwelling point can be indicated with different colors, shapes, and/or intensities that contrast with the displayed image 14 and the selected gaze points 54. For example, the dwelling point is indicated with a blinking dot, and the gaze points are indicated with yellow dots in a gray scale image. The select gaze points 54 are collected in a list from the points generated by the gaze-tracking device one second preceding the mouse click. The points collected in the list are related spatially to the dwelling point 24 and to the displayed image 14.

Figure 3:
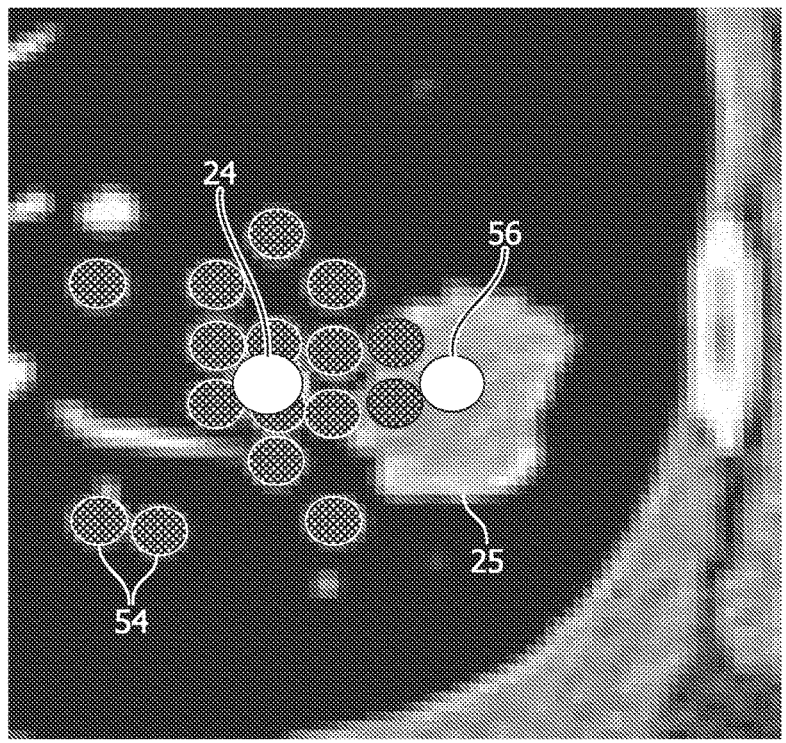
FIG. 3 illustrates the exemplary medical image with a calibration setting.

With reference to FIG. 3, the exploded view 52 of the exemplary medical image with gaze points illustrates a calibration setting or additional input from one or more of the input devices 22. The dwelling point 24 and the selected gaze points 54 are displayed a distance away from the ROI 25. The gaze point collector 32 calibrates a spatial location of the selected gaze points 54 relative to the ROI 25. For example, with an input spatial location 56, such as a click or "click and drag" input from a mouse on the intended ROI 25, the calibration of gaze points in 32 is based on the mismatching between the dwelling point 24 and a translated dwelling point 60. The distance between the dwelling point 24 and the translated dwelling point 60 provides a calibrated measurement, which is applied to the selected gaze points 54 based on the dwelling point 24. The calibrated measurement accounts for both user bias and system error. A properly aligned dwelling point, e.g. the resulting translation, is represented in the exploded view 52 of FIG. 2.

Figure 4:
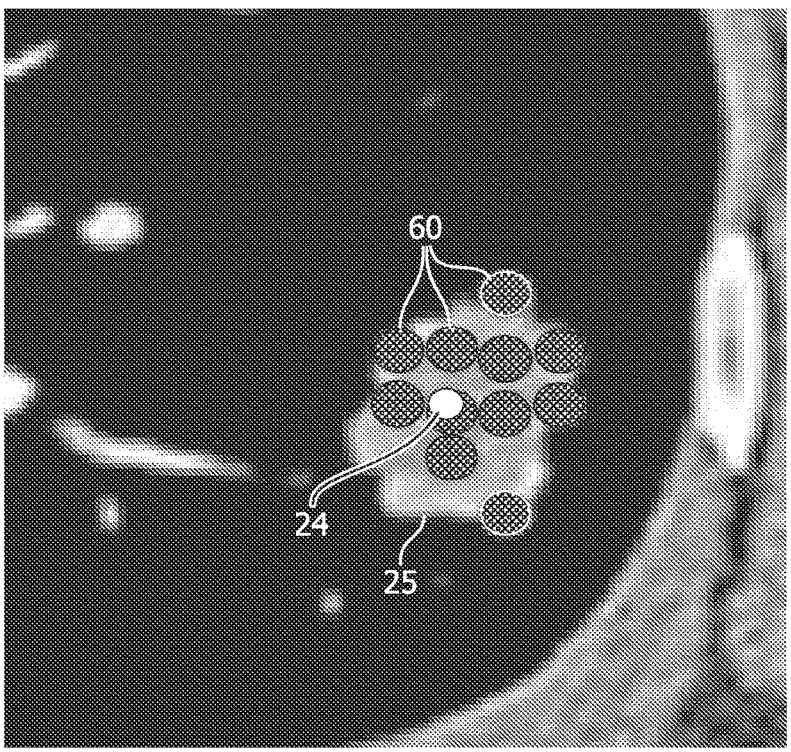
FIG. 4 illustrates the exemplary medical image with filtered gaze points.

With reference to FIG. 4, the exploded view of the exemplary medical image is illustrated with filtered gaze points 60. In one embodiment, a maximum likelihood analysis by the gaze point filter 34 refines the selected gaze points 54 to a subset. The maximum likelihood analysis uses intensity similarity, gradient similarity and/or spatial distance between the pixels of the dwelling point 24 and each gaze point to filter. Other filter techniques are contemplated. Selected gaze points 54, which are likely similar, are included in the filtered subset; and selected gaze points 54, which are likely dissimilar, are excluded. For example, the selected gaze points illustrated in FIG. 2 located in the dark area are excluded, and the selected gaze points located in the whitish region of the ROI are included in the filtered gaze points 60. In medical images with the underlying nature of the ROIs, the different modalities and the different imaging parameters available with each modality, and the selected gaze points 54 are noisy, e.g. gaze points located near and outside the ROI, and are excluded through filtering.

Figure 5:
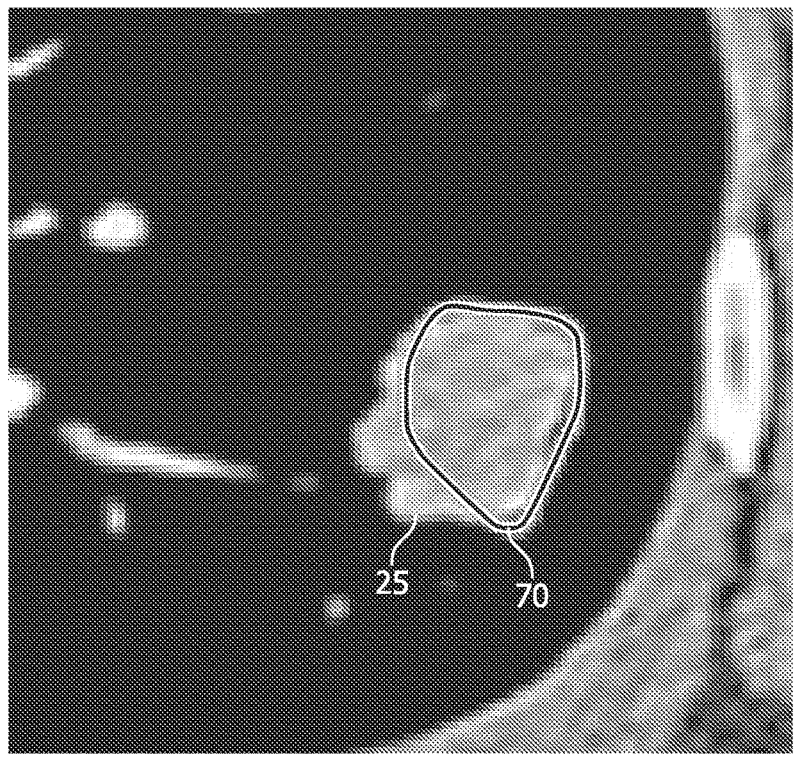
FIG. 5 illustrates the exemplary medical image with an initial boundary based on the filtered gaze points.

With reference to FIG. 5, the exemplary medical image with an initial boundary 70 based on the filtered gaze points 60 is illustrated. The boundary identifier 36 generates the boundary using an active contour model or algorithm, and/or a level set algorithm. The algorithms convert the spatial points with pixel values represented by the gaze points or filtered gaze points to a continuous boundary. The initial boundary 70 can be displayed on the display device 20. In the exemplary medical image, the initial boundary 70 is represented as a continuously bounded region with a broad line in a checkerboard pattern. The initial boundary 70 can be represented with different textures, colors, highlight, etc., which contrast with the displayed image 14.

Figure 6:
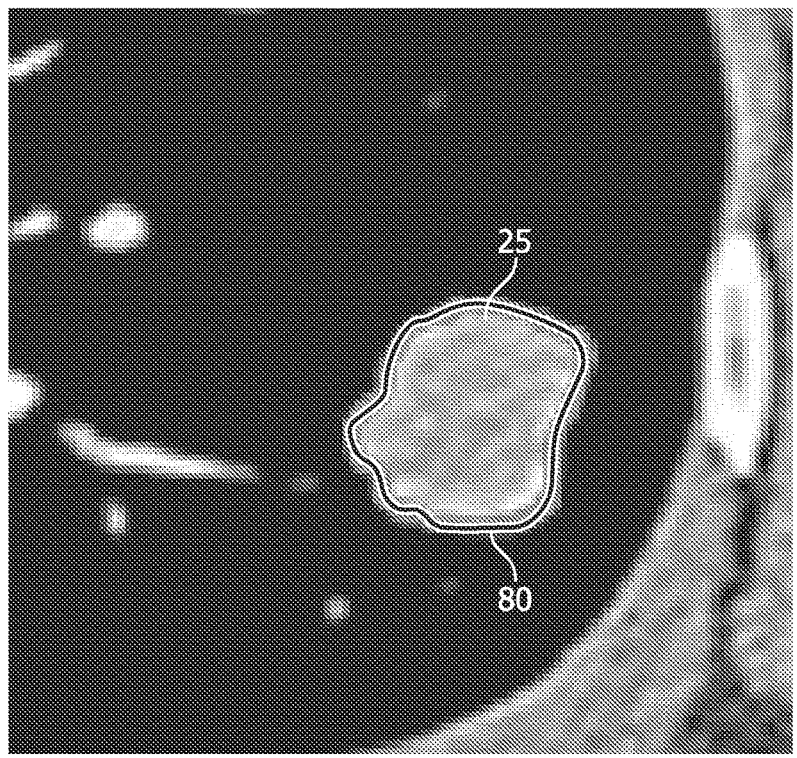
FIG. 6 illustrates the exemplary medical image with the segmented ROI.

With reference to FIG. 6, the exemplary medical image with the segmented ROI 80 is illustrated. The region identifier 38 segments the ROI 25 using the initial boundary 70 as input. The region identifier 38 segments the ROI 25 using an automatic region segmentation technique, such as a region growing algorithm, an active contour algorithm, a live wire algorithm, and/or a region based level set algorithm. In one embodiment, a cost function compares pixel values of pixel locations outside a current boundary with the pixel values of pixel locations within the current boundary to determine inclusion in a revised boundary. The segmented ROI 80 can be displayed on the displayed image 14, displayed separately, used further for area or volumetric measurements, and/or stored in an image data store 40. In the exemplary medical image, the segmented ROI 80 is represented by a continuous checkerboard line surrounding the ROI 25, which appears whitish in a dark surrounding area. The segmented ROI 80 can be displayed using color, textures, highlights, etc., which contrast with the displayed image 14.

With reference to FIG. 7, one method of using an embodiment of gaze point driven ROI segmentation is flowcharted. In a step or by a module 90, gaze tracking is calibrated. The gaze tracking calibration, using the gaze tracking device 28, calibrates a user gaze to the coordinate system of the display device 20. The calibration can include construction and/or updating of a user profile, which is stored and reused. For example, a point can be displayed and the user's measured gaze point is calibrated to the display point. The calibration can be refined by repeating this technique with additional points displayed at various locations on the screen.

The image 14 is displayed in a step or by a module 92 on the display device 20. The displayed image 14 can be received from an image data store 16, such as system accessible storage, directly accessible storage, and the like.

Gaze points 30 are generated relative to the displayed image 14 by the gaze tracking device 28 in a step or by a module 94. Each gaze point includes a temporal and a spatial attribute. For example, a gaze point includes a timestamp, $T_i$, and a location, $(x_i, y_i)$, relative to the display device and/or displayed image. Locations relative to the display device are translated to locations relative to the displayed image.

In a step or by a module 96, gaze points 30 are selected from the generated gaze points 30 corresponding to the ROI 25 of the displayed image 14. An input from one or more input devices 22 determines the dwelling point 24. The input fixes a point spatially and temporally. A corresponding predetermined time interval is used for selecting gaze points, which are selected from the generated gaze points 30 within the predetermined time interval. For example, a mouse click inputs an image location and occurs at a time $T_m$, and $T_m$ corresponds to a predetermined time interval of 0.8 seconds displaced 0.2 seconds before input, [$T_m$-1.0 seconds, $T_m$-0.2 seconds], selects generated gaze points which occurred within the interval [$T_m$-1.0 seconds, $T_m$-0.2 seconds]. The selected gaze points 54 indicate the user input of the ROI 25 to be used for segmentation.

In a decision step or by a module 98, a calibration is determined. The calibration uses an input to translate the selected gaze points 54. For example, with the selected gaze points displayed, the system pauses input. In a step or by a module 100, selected gaze points 54 are calibrated using an input. For example, a drag and drop operation using a mouse input translates the selected gaze points relative to the displayed image, e.g. shifts the displayed gaze points. The translation can use the dwelling point 24 as an anchor point for the translation. In one embodiment, the translation uses the selected gaze points as a connected cloud or cluster of gaze points to move the cloud or cluster in one input operation.

The selected gaze points 54 can be filtered in a step or by a module 102. The filter uses a maximum likelihood analysis of the pixel values of the dwelling point 24 and the pixel values of the selected gaze points 54, to determine inclusion/exclusion in the filtered gaze points 60. The maximum likelihood analysis uses intensity similarity, gradient similarity, and/or spatial distance. For example, distance from the dwelling point is used to exclude selected gaze points greater than a maximum distance. In one embodiment, the filtered gaze points 60 are displayed, and additional input can further remove individual filtered gaze points.

In a step, or by a module 104, the initial estimated boundary 70 is generated based on the filtered gaze points 60. In one embodiment, the boundary 70 is generated based on the selected gaze points 54. The boundary 70 is generated by the boundary identifier 36 using, for example, an active contour algorithm or a level set algorithm. The algorithms input the filtered gaze points 60 and displayed image 14 pixel locations and values, and generates a continuous boundary, e.g. snake.

In a step, or by a module 106, the ROI 25 is segmented based on the estimated boundary 70. The region identifier 38 uses an automatic segmentation technique to expand/contract the estimated boundary 70 to the segmented ROI 80. The automatic segmentation technique includes, for example, a region growing algorithm, an active contour algorithm, a live wire algorithm, or a region-based level set algorithm.

The steps can be repeated for other ROIs. The steps can include repeating and/or returning to other steps. For example, calibrating the selection points 100 can be repeated. In another example, based on a display of the selected gaze points 54 and/or the filtered gaze points 60, the processing can return to generating the gaze points 94 or calibrating gaze tracking 90.

It is to be appreciated that in connection with the particular illustrative embodiments presented herein, certain structural and/or functional features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that particular elements or components described herein may have their functionality suitably implemented via hardware, software, firmware or a combination thereof. Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions; or certain individual functions may be split up and carried out by a plurality of distinct elements acting in concert. Alternately, some elements or components, otherwise described and/or shown herein as distinct from one another, may be physically or functionally combined where appropriate.

In short, the present specification has been set forth with reference to preferred embodiments. Obviously, modifications and alterations will occur to others upon reading and understanding the present specification. It is intended that the invention be construed as including all such modifications and alterations insofar as they come within the scope of the appended claims or the equivalents thereof. That is to say, it will be appreciated that various of the above-disclosed and other features and functions, or alternatives thereof, may be desirably combined into many other different systems or applications, and also that various presently unforeseen or unanticipated alternatives, modifications, variations or improvements therein may be subsequently made by those skilled in the art which are similarly intended to be encompassed by the following claims.

What is claimed is:

1. A region of interest, ROI, segmentation system, comprising:
   a display device configured to display an image;
   a gaze-tracking device configured to generate gaze points relative to the displayed image;
   a gaze point collector configured to select gaze points from the generated gaze points corresponding to a ROI of the displayed image;
   a boundary identifier configured to estimate a boundary based on the selected gaze points; and
   a region identifier configured to segment the ROI based on the generated boundary.

2. The ROI segmentation system according to claim 1, wherein the gaze point collector is further configured to generate a dwelling point from the generated gaze points, and the dwelling point identifies a spatial location in the displayed image within the ROI, and the dwelling point defines a spatial and temporal proximity of the selected gaze points; and
   wherein the display device is further configured to display a visual representation of the dwelling point relative to the displayed image.

3. The ROI segmentation system according to claim 1, further including:
   a computer input device which inputs a dwelling point identifying a spatial location in the displayed image within the ROI, and the dwelling point defines a temporal proximity of the selected gaze points; and
   wherein the display device is further configured to display a visual representation of the dwelling point relative to the displayed image.

4. The ROI segmentation system according to claim 1, further including:

a gaze point filter configured to filter the selected gaze points according to image characteristics of the dwelling point; and wherein the boundary identifier is further configured to generate the boundary based on the filtered gaze points.

5. The ROI segmentation system according to claim 2, wherein the gaze point filter filters using a maximum likelihood analysis including at least one of:
intensity similarity between a pixel of the image corresponding to the dwelling point and pixels of the image corresponding to the selected gaze points;
gradient similarity between the pixel of the image corresponding to the dwelling point and pixels of the image corresponding to the selected gaze points; or
a spatial distance from the pixel of the image corresponding to the dwelling point and pixels of the image corresponding to the selected gaze points.

6. The ROI segmentation system according to claim 2, wherein the display device is configured to display visual representations of the selected gaze points; and
the gaze point collector is further configured to calibrate a spatial location of the selected gaze points relative to the ROI based on an input from a computer input device identifying a location in the displayed image.

7. The ROI segmentation system according to claim 1, wherein the boundary identifier is configured to generate the estimated boundary using at least one of an active contour algorithm and a level set algorithm.

8. The ROI segmentation system according to claim 1, wherein the region identifier is configured to segment the ROI further based on at least one of:
a region growing algorithm;
an active contour algorithm;
a live wire algorithm; or
a level set algorithm.

9. The ROI segmentation system according to claim 1, wherein the gaze-tracking device includes at least one of a stationary mounted device and a body worn device.

10. The ROI segmentation system according to claim 1, wherein the displayed image is received from at least one of:
a picture archiving and communication system (PACS); and
a medical imaging device.

11. A method of region of interest, ROI, segmentation, comprising:
displaying an image;
generating gaze points relative to the displayed image;
selecting gaze points from the generated gaze points corresponding to a ROI of the displayed image;
estimating a boundary based on the selected gaze points; and
segmenting the ROI based on the estimated boundary.

12. The method of ROI segmentation according to claim 11, wherein selecting includes:
inputting a dwelling point which identifies a spatial location in the displayed image within the ROI, and the dwelling point determined a temporal proximity of the selected gaze points; and
displaying a visual representation of the dwelling point relative to the image.

13. The method of ROI segmentation according to claim 11, further including:
filtering the selected gaze points according to image characteristics of the dwelling point; and
wherein estimating the boundary is based on the filtered gaze points.

14. The method of ROI segmentation according to claim 11, wherein filtering uses a maximum likelihood analysis including at least one of:
intensity similarity between a pixel of the image corresponding to the dwelling point and pixels of the image corresponding to the selected gaze points;
gradient similarity between the pixel of the image corresponding to the dwelling point and pixels of the image corresponding to the selected gaze points; or
a spatial distance from the pixel of the image corresponding to the dwelling point and pixels of the image corresponding to the selected gaze points.

15. The method of ROI segmentation according to claim 11, further including:
displaying visual representations of the selected gaze points; and
calibrating a spatial location of the selected gaze points relative to the ROI based on an image location input from a computer input device.

* * * * *